Figure 1:
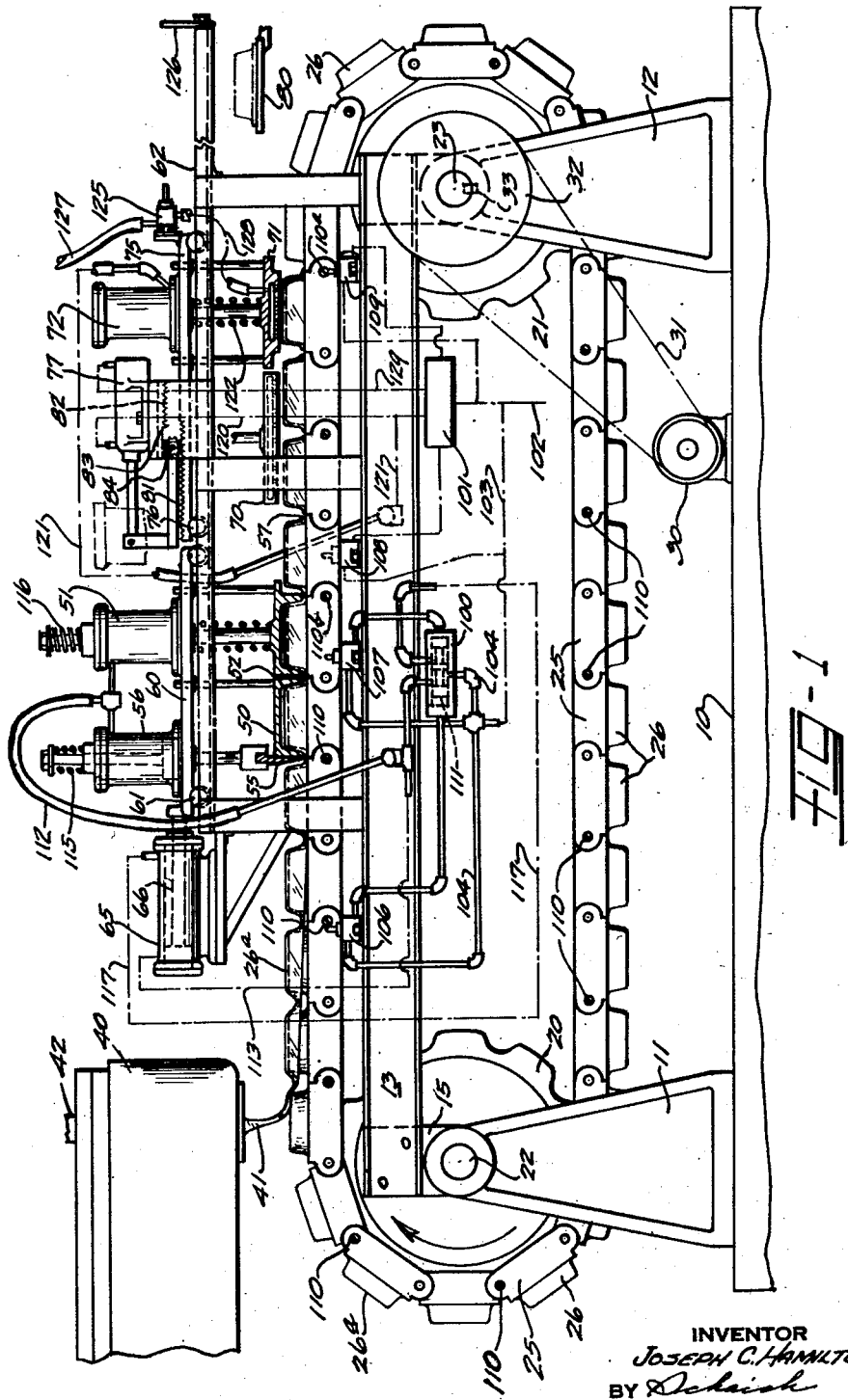

Sept. 24, 1957 J. C. HAMILTON 2,807,121
RIBBON FORMING OF HOLLOW GLASS ARTICLES
Filed Dec. 13, 1954 2 Sheets-Sheet 2

INVENTOR
JOSEPH C. HAMILTON
BY
ATTORNEYS

United States Patent Office 2,807,121
Patented Sept. 24, 1957

2,807,121

RIBBON FORMING OF HOLLOW GLASS ARTICLES

Joseph C. Hamilton, Toledo, Ohio, assignor to Owens-Illinois Glass Company, a corporation of Ohio Application December 13, 1954, Serial No. 474,705

6 Claims. (Cl. 49—5)

My invention relates to a method and apparatus for forming hollow glass articles such as the light transmitting portions of a cathode ray tube or such other similar shaped articles.

In the normal procedure of forming such articles a gob or charge of molten glass is deposited in a mold and a pressing plunger cooperating with said mold displaces the glass throughout the area between the pressing plunger and the mold to form thereby a hollow article.

When the charge is first positioned in the mold it covers a relatively small area of the mold as compared to the total area of the mold. At the time of such deposition of the charge in the mold the glass is highly viscous and tends of rapidly settle out and assume a flattened position due to the action of gravity. This flattening out of the gob as a general rule invites the appearance of rings or circle like marks which are highly detrimental in the light transmitting portions of the article.

It is an object of this present invention to form these light transmitting members in such a manner that these detrimental rings or surface marks will not be present therein.

It is the further object to produce these articles in rapid sequence and without the use of a measured gob or a separately pre-formed charge of molding glass.

Still another object is to continuously flow a ribbon of workable glass from a source of molten glass and to progressively and continuously form shaped hollow glass articles therefrom.

Other objects will be apparent from the drawings and the following descriptive matter.

Figure 2:
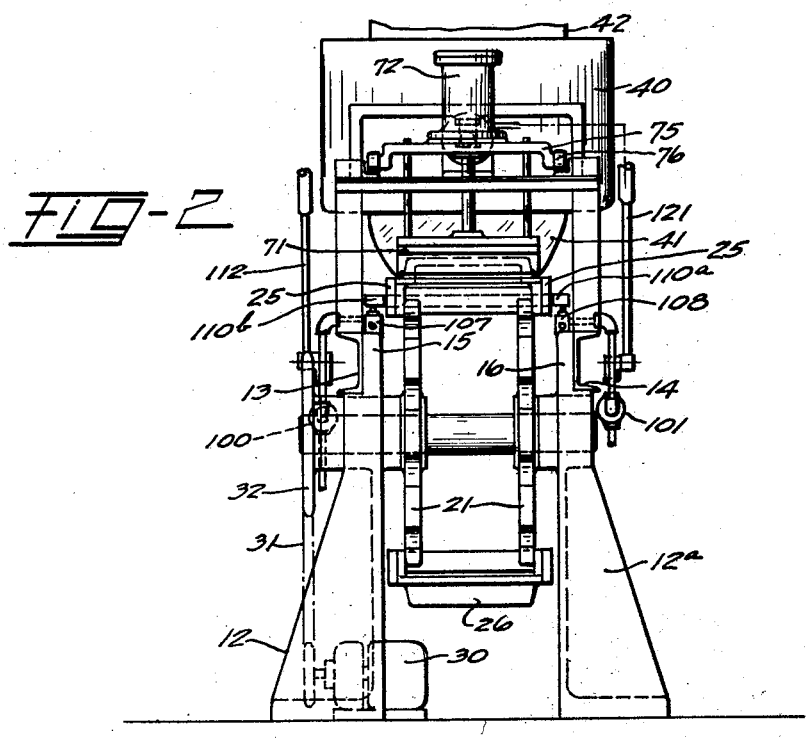
Figure 3:
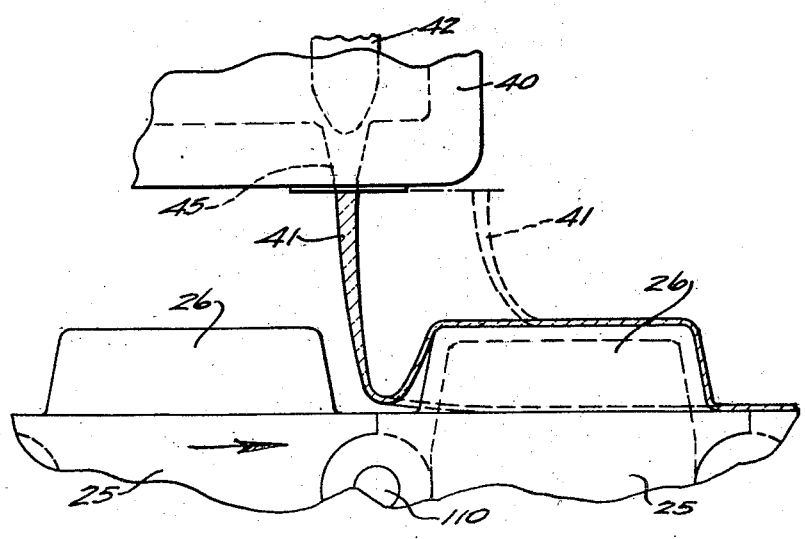

In the drawings:

Fig. 1 is an elevational view of the glass ribbon flowing device in combination with the article forming machine, Fig. 2 is an elevational end view of the forming mechanism and Fig. 3 is an enlarged illustrative view showing the manner in which the ribbon of glass progressively envelopes the article forming members.

Referring to the drawings and in particular Fig. 1, there is shown a base 10 upon which is mounted support members 11, 11a, 12 and 12a adapted to respectively support the front and rear end portions of the forming mechanism. The channel members 13 and 14 attach the support members 11, 11a, 12 and 12a together through attachment to extensions 15 and 16 formed on said support members.

Sprockets 20 and 21 are mounted respectively on horizontal shafts 22 and 23 mounted respectively in the end support members 11 and 12 and these sprockets carry a continuous link type chain comprised of a series of pairs of links 25, each said pair of links carrying therebetween a molding or shaping member 26. The link chain is driven in a clockwise direction through an adjustable speed motor 30, drive chain 31 and sprocket 32 attached to the shaft 23 through a key 33.

Mounted above the conveyor chain and at the forward end thereof, is a glass feeding device 40, adapted to flow a ribbon of molten glass 41 vertically downward, the volume of flow of said ribbon of glass being controlled by an adjustable plug 42. As the shaping members 26 pass in continuity beneath the glass feeding member 40 with the ribbon of glass 41 flowing downwardly thereupon, there must of course, be some coordination as between the speed of movement of the shaping members 26 and the rate of flow of the ribbon of glass 41. Such coordination may of course, be provided or obtained through the adjustment of the speed of the motor 30, the temperature of the ribbon of glass and/or adjustment of both. Other obvious or well known adjustments may be provided.

The stream 41, of molten glass must be provided from the orifice 45 at a width sufficient to encompass the flat horizontal tube face and the vertical side wall portions of the shaping members 26. Any ordinary or well known stream width maintaining means may of course, be utilized for this purpose.

As illustrated in Fig. 1, as the ribbon of glass flows downwardly it settles down upon the flat face portion 26a and wraps downwardly around the vertical portions of each shaping member 26. As the ribbon on the members 26 proceeds through the continuing cycle, a shaping member 50 actuated by an air motor 51, is brought down into physical contact with the glass forming the vertical side portions only of an on the shaping members 26. There is no actual physical contact as between the shaping member 50 and the horizontal tube or face portions 26a of the glass.

Coincident with this contact between the shaping member 50 and the glass, a severing member 55 actuated by an air motor 56 is brought down into engagement with the glass to provide a severance between that portion of the glass between each second shaping member 26. A scoring member 52 is mounted on the shaping member 50 and is so arranged as to provide a sharp score line in the glass between the members 26 and alternate to the shearing.

The shaping member 50 and the severing device 55 and their actuating cylinders 51 and 56 respectively are mounted on a movable platform 60 supported by roller 61 mounted on a track 62. Air motor 65 is connected to the platform 60 through its piston rod 66. Through the action of the above described shaping member 50 the glass articles are brought to the contour of the shaping members 26 and the vertical side walls are chilled sufficiently by this contact with the shaping member 50 to retain their molded shape. Such shaping, scoring and severing is accomplished while the shaping member 50, the severing member 55 and the scoring member 52 are moving in synchronism with the shaping members 26 through actuation of the motor 65.

As the glass members or articles move from this zone they proceed as individual glass members and pass beneath a member 70 which may be adapted either for cooling or heating as the situation may demand. As these glass members pass beyond this heating or cooling zone they come beneath a vacuum transfer device 71 which is actuated through a motor 72. This transfer device is adapted to raise each glass article off its respective shaping member 26 by means of this vacuum transfer member 71 and simultaneous therewith the movable platform 75 mounted on rollers 76 is moved along the track 62 by means of the air motor 77.

This transfer mechanism operates with respect to each individual glass article and as a consequence it must move with sufficient rapidity to pick up an article and transfer it to an article conveyor 80 and return to its initial pick up point in the length of time it is required for a succeeding article to reach the pick up point. Because of this needed speed of operation a rack 81 attached to the movable table 75 and a second stationary rack 82 attached to the cylinder supporting bracket 83 are adapted to cooperate with a pinion 84. When the air motor 77 is actuated to move the pinion 84 to the right in Fig. 1, the pinion moves without rotation along the rack 81, a distance which permits the air motor 72 and transfer plate 71 to raise the glass article off of the forming member 26. By the time this has occurred the pinion 84 contacts the teeth of rack 82 and begins to rotate thereby moving the table 75 to the right in Fig. 1 at a speed faster than that of the horizontal motion of the pinion 84. This is due to the fact that the rack 82 is held stationary and as the pinion 84 is moving relative thereto it will be caused to rotate at a higher speed and consequently move the table 75 with greater rapidity. In other words, the transfer member 71 will be caused to move from the point where it picks up the glass article to the discharge point over the conveyor 80 in the same length of time as is required for the pinion 84 to move half the distance. Such acceleration of speed permits the transfer member 71 to move from the ware receiving point to the discharging point and back to the ware receiving point in time to pick up the next successive glass article.

These various above described air motor operations are controlled through the continuous motion of the chain 25 and a pair of master control valves 100 and 101. These control valves are supplied by air under pressure from a main line 102 through branches 103 and 104. These two valves are identical in structure.

Cooperating with these master control valves and acting as the actuators are trip valves 106, 107, 108 and 109. These last mentioned trip valves are actuated by hinge pins 110 which extend completely through and beyond each side of the chain 25 and are thus adapted to operate the trip valve positioned on opposite sides of the chain.

It will be noted that valves 106 and 107 are on the left hand side of the chain in Fig. 2 and that valves 108 and 109 are on the right hand side. The horizontal positioning of these valves along the length of the channel member 13 will of course, control the timing of the various units they actuate.

Referring to Fig. 1, it will be noted that trip valve 106 has just been actuated by the pin 110 and has shifted the valve 111 to the right thus admitting air from line 104 to the line 112 which provides fluid to the top end of the cylinders 51 and 56. This air acts against the piston and moves the members 50 and 55 downward into position to co-act with the glass on the shaping members 26. At the same time air is carried through line 113 to the rear end of piston motor 65 and thus permits the platform 60 to move in the same direction and in synchronism with the glass shaping members 26.

The platform 60 and the members 50 and 55 travel with the glass shaping members 26 until such time as a pin 110 trips valve 107. The tripping of this valve 107 reverses the position of valve 111 discontinuing air from the line 112 permitting the springs 115 and 116 of the respective cylinders 51 and 56 to lift the shaping member 50 and the severing member 55 from contact with the glass. At the same time air is admitted to line 117 which admits air to the forward end of cylinder 65 and starts the platform 60 on its retractive motion.

Inasmuch as the member 50 cooperates in the simultaneous shaping of two (2) glass members there will thus be provided a lag in time so that the platform 60 will reach its retracted position in time for co-acting with the next successive pair of glass members.

During the carrying out of the preceeding operations and simultaneously therewith, the transfer mechanism 71 has also been in operation. In this situation the extension of one of the pins 110a on the opposite side of the chain 25 has actuated the trip valve 109, which in turn actuates the valve 101 supplying air to line 120 and thence to the end of the cylinder 77. At the same time air is supplied through line 121 to the lower end of cylinder 72 raising the transfer member 71 against the action of the spring 122 and raising a shaped glass article to a level above the shaping members 26.

By this time the pinion 84 has made contact with the rack 82 starting this pinion in rotation and through its contact with the rack 81 moving the table 75 to the right in Fig. 1, bringing a glass article to the position over the conveyor 80.

As a platform 75 reaches the position over the conveyor 80, the valve 125 contacts a stop 126 disrupting the vacuum from a main supply line 127 through line 128 to the transfer member 71. This permits the glass article to be released from the transfer arm 71 and deposited on the conveyor 80. Simultaneous therewith an extension 110b of the pin 110 trips valve 108 reversing the position of valve 101 shutting off the air to line 121 and providing air through line 129 to the opposite end of cylinder 77 thus moving the pin 84 in the opposite direction and retracting the transfer member to the ware receiving point as in Fig. 1. Simultaneous with the cessation of air to line 121, the spring 122 moves the transfer member 71 downwardly into position over the next succeeding piece of glass ware. With the movement of valve 125 away from stop 126 vacuum is again supplied to the member 71.

The continuous motion of the chain 25 and successive tripping of the various control valves causes these above described operations to be repeated in constant succession.

The general operation of the machine is as follows.

A ribbon of molten glass 41 of a width greater than the width of the ultimate article to be produced flows from a feeding forehearth 40 and is progressively spread in encompassing relation over a successive series of shaping members 26 provided in coordinated, moving continuity beneath and central of the flowing ribbon 41 of molten workable glass.

The speed of the chain 25 is coordinated with the rate of flow of the ribbon of glass to the extent that the glass will be permitted to flow downwardly around the approximate vertical edges of the shaping members 26. As this progression of ribbon formation moves along a shaping member 50 is brought into contact with the vertical portions of the glass member both to control its thickness and shape and to retain its position with respect to the shaping member 26.

Simultaneous with this shaping action severing member 55 and a scoring member 52 contacts the ribbon of glass 41 through its width thereby scoring and shearing same so that each glass member becomes a separate distinct entity on each shaping member 26. These shaping severing and scoring members 50, 55 and 52 respectively are adapted to move in synchronism with the glass members through a portion of their horizontal motion and then to return to pick up succeeding shaped glass members for successive finishing.

As these glass members proceed further along the path subsequent to shaping and forming they are either cooled or heated as the case may require by a member 70 and thereafter they are connected by a vacuum to transfer member 71 which removes them from the shaping mold or member 26 and places them on conveyor 80. All of these above outlined actions are obtained or coordinated through a system of fluid actuated motors and control valves, all being actuated by the continuous motion of the forming and shaping table 25.

Modifications may be resorted to within the spirit and scope of my invention.

I claim:

1. The method of forming hollow glass articles which comprises providing a continuous vertical ribbon flow of molten glass, translating said vertical flow into a horizontal flow by synchronously moving a series of male shaping members at right angles to said vertical flow and into a position beneath and along one side of said ribbon, concurrently enveloping the top face and side portions of said shaping members with said ribbon, mechanically ironing the glass on said side portions only of said shaping members to finally shape said articles and simultaneously separating each said shaped article from the ribbon.

2. The method of forming hollow glass articles which comprises providing a continuous vertical ribbon flow of molten glass, translating said vertical flow into a horizontal flow by synchronously moving a series of male shaping members at right angles to said vertical flow and into a position beneath and along one side of said ribbon, progressively and concurrently enveloping the top face and side portions of said shaping members with said ribbon, mechanically ironing the glass on said side portions only of said shaping members to finally shape said articles and simultaneously separating each said shaped article from the ribbon.

3. The method of forming hollow glass articles which comprises providing a continuous vertical ribbon flow of molten glass of a width greater than that of the ultimate shaped article, translating said vertical flow into a horizontal flow by synchronously moving a series of internal shaping members at right angles to said vertical flow and into a position beneath and along one side of said ribbon, progressively draping said ribbon over and enveloping the face and side portions of the successive shaping members with said ribbon, mechanically ironing the glass on said side portions only of said shaping members to finally shape said articles, separating each shaped article from the ribbon, and coordinating the movement of said shaping members with the rate of flow of said ribbon.

4. In a hollow glass shaping device the combination of a series of internal shaping members each said member having top and side shaping portions, a plurality of side ironing members adapted to successively cooperate with said internal shaping members, a glass severing device, a vacuum transfer device, means to provide a continuous ribbon of molten glass successively to each shaping member and means operable in timed sequence to actuate said internal and external shaping members, said severing device and said transfer device.

5. In a hollow glass shaping device the combination of a series of internal shaping members, means to move said members in a closed path, a plurality of external side shaping members, means to bring said external shaping members into cooperation with successive internal shaping members, and a scoring and severing means operable in synchronism with said shaping members.

6. A device in accordance with claim 5 including a transfer device and means to operate same in synchronism with said side shaping devices.

References Cited in the file of this patent

UNITED STATES PATENTS

| | | |
|---|---|---|
| 1,384,967 | McSwain | July 19, 1921 |
| 1,557,504 | Vollmar | Oct. 13, 1925 |
| 2,179,317 | Barnard | Nov. 7, 1939 |
| 2,301,892 | Lewis | Nov. 10, 1942 |

FOREIGN PATENTS

| | | |
|---|---|---|
| 671,772 | Great Britain | May 7, 1952 |